United States Patent
Storck

(10) Patent No.: US 7,516,971 B2
(45) Date of Patent: Apr. 14, 2009

(54) BICYCLE FORK, BICYCLE FRAME AND METHOD FOR PRODUCING A BICYCLE FRAME

(75) Inventor: Markus Storck, Idstein-Oberrod (DE)

(73) Assignee: Storck Bicycle GmbH, Bad Camberg (DE)

( * ) Notice: Subject to any disclaimer, the term of this patent is extended or adjusted under 35 U.S.C. 154(b) by 0 days.

(21) Appl. No.: 10/480,669

(22) PCT Filed: Jun. 13, 2002

(86) PCT No.: PCT/EP02/06524

§ 371 (c)(1),
(2), (4) Date: Aug. 12, 2004

(87) PCT Pub. No.: WO02/100709

PCT Pub. Date: Dec. 19, 2002

(65) Prior Publication Data

US 2005/0040622 A1  Feb. 24, 2005

(30) Foreign Application Priority Data

Jun. 13, 2001 (DE) .............................. 101 28 676

(51) Int. Cl.
*B62K 3/02* (2006.01)
(52) U.S. Cl. .................. 280/284; 280/274; 280/283
(58) Field of Classification Search ................ 280/283, 280/284, 285, 275, 274
See application file for complete search history.

(56) References Cited

U.S. PATENT DOCUMENTS

| | | | | |
|---|---|---|---|---|
| 433,172 A * | 7/1890 | Jett | ............................ | 280/251 |
| 453,514 A * | 6/1891 | Shier | ........................... | 280/275 |
| 645,474 A * | 3/1900 | Kiefer | ......................... | 280/275 |
| 1,114,855 A * | 10/1914 | Buckliand | .................... | 280/275 |
| 1,335,765 A * | 4/1920 | Viard et al. | ................. | 280/284 |
| 2,107,251 A * | 2/1938 | Peace | ......................... | 280/284 |
| 2,157,971 A | 5/1939 | Snell | | |
| 2,178,939 A * | 11/1939 | Pease | ......................... | 280/283 |
| 2,264,981 A * | 12/1941 | Jencick | ....................... | 280/283 |
| 4,129,317 A * | 12/1978 | Bell | ........................ | 280/281.1 |
| 4,453,730 A * | 6/1984 | Klose | ...................... | 280/281.1 |
| 4,787,648 A | 11/1988 | Coetzee | | |
| 4,838,569 A * | 6/1989 | Ford | ............................ | 280/275 |
| 5,403,028 A * | 4/1995 | Trimble | ...................... | 280/284 |
| 6,109,637 A * | 8/2000 | Kirk | ........................... | 280/284 |
| 6,783,142 B1 * | 8/2004 | Schober | ...................... | 280/284 |
| 6,932,371 B2 * | 8/2005 | Perez | ......................... | 280/283 |

FOREIGN PATENT DOCUMENTS

| | | | |
|---|---|---|---|
| EP | 0669247 A1 * | 8/1995 | |
| FR | 839 312 | 3/1939 | |
| FR | 896 511 | 2/1945 | |
| FR | 2807995 A1 * | 10/2001 | |
| JP | 10316076 | 2/1998 | |
| KR | 2001084739 A * | 9/2001 | |

* cited by examiner

*Primary Examiner*—Paul N Dickson
*Assistant Examiner*—Daniel Yeagley
(74) *Attorney, Agent, or Firm*—Greer, Burns & Crain, Ltd.

(57) ABSTRACT

The invention relates to a bicycle frame including a base frame and at least one device which is mounted on the base frame, provided in the form of a brace structure, and has an accommodating area for accommodating a wheel. The invention also relates to a bicycle fork and to a method for producing a bicycle frame.

25 Claims, 4 Drawing Sheets

BICYCLE FORK, BICYCLE FRAME AND METHOD FOR PRODUCING A BICYCLE FRAME

BACKGROUND

The invention relates to a bicycle fork, a bicycle frame and a method for producing a bicycle frame.

Bicycle forks, bicycle frames and methods for producing bicycle frames are already known.

A known bicycle frame comprises a base frame having a head tube designed to accommodate a bicycle fork. Such base frame further comprises a seat tube designed to accommodate a bicycle saddle. Furthermore, a rear body is linked to the base frame and comprises chain braces and seat braces. This rear body is pivotally linked to the base frame. Further, the rear body is supported at the base frame by a spring damper system. Said spring damper system comprises a damper and a spring. In a variant of this configuration the spring is a coil spring. In an alternative configuration the spring is an air spring.

The object of the present invention is to provide a bicycle fork, a bicycle frame and a method for producing a bicycle frame which is configured differently in that at least one feature is different from that of known bicycle frames or known bicycle forks or the known method for producing bicycle frames, respectively.

SUMMARY

According to the invention, there is in particular provided a bicycle frame having a base frame and at least one device mounted on said base frame. The device is configured as a brace structure, having an accommodating area for accommodating a wheel. At least one brace of said brace structure is resilient such that the accommodating area is spring-loaded or spring-mounted, respectively.

The accommodating area or the wheel receiver, respectively, is in particular a dropout.

Reference is made to the fact that a spring-mounted accommodating area is in particular to be understood such that a wheel mounted on the bicycle frame is spring-mounted. However, such a wheel is not compulsorily a component of a bicycle frame such that, for the sake of simplicity, the present disclosure generally refers to the bearing of the accommodating area or the wheel receiver, respectively.

The base frame comprises, if it is designed as a classical bicycle frame, a head tube, a down tube, a seat tube, possibly a crank set housing, and possibly a top tube.

However, reference is made to the fact that the term "base frame" in the sense of the present invention is not intended to be limited to the configuration mentioned above. Present-day frames tend to be configured such that the mentioned classical terms of frame tubes or frame elements of such a base frame cannot always be unambiguously applied. The present invention is intended to extend to bicycle frames having such base frames.

The device mounted on the base frame is preferably a bicycle rear body or a bicycle fork. A bicycle rear body comprises, in the classical sense, in particular a seat brace and a chain brace.

However, the invention is not intended to be limited to rear bodies having a seat brace and a chain brace. For example, the rear body may be configured such that it does not comprise a seat brace. In classical bicycles, the chain brace connects the wheel receiver or the drop out with the crank set and the seat brace connects the wheel receiver or the dropout with the seat tube. However, the invention is not intended to be limited to such configurations. For examples it is also preferred that the "seat brace" connects the wheel receiver or the dropout with a down tube. As mentioned, a seat brace may be entirely absent. A plurality of further configurations of such a rear body is preferred.

According to the invention, the device or the rear body, respectively, or the bicycle fork are designed as a brace structure.

A brace structure in the sense of the present invention is in particular a configuration having at least one brace. A brace structure preferably comprises more than one brace.

Such braces may be tube-shaped or made of solid material and may have many different cross-sections such as rectangular cross-sections or round cross-sections or ellipsoid cross-sections. These exemplarily indicated cross-sectional shapes, however, are not intended to limit the invention. Rather, a plurality of other cross-sectional shapes is also conceivable. Different braces at a bicycle frame may have different cross-sections.

A particularly preferred configuration is a resilient brace designed, in particular as regards the cross-sectional area, such that the bending resistance about an axis perpendicular to the plane of the bicycle, is significantly lower than about an axis substantially in the plane of the bicycle. Said brace may be configured such that it is substantially rigid in respect of bending about a bend axis in or parallel to the plane of the bicycle. It is also preferred that the at least one resilient brace is not rigid about such a bend axis and that other measures such as providing stabilizing devices or the like substantially prohibit a bending of said resilient brace about said axis.

It is particularly preferred that the resilient brace is configured as a plate type wherein the larger cross-sectional dimension is substantially perpendicular to the plane of the bicycle.

A preferred configuration is that the rear body comprises at least one chain brace and/or at least one seat brace, at least one of which is configured resilient.

It is particularly preferred that both the seat brace and the chain brace are configured resilient.

It is preferred that at least one, particularly preferred all of the resiliently configured braces act as a kind of spring by means of which a wheel receiver, such as a front wheel receiver or a rear wheel receiver or wheels attached to them, are spring-mounted.

A particularly preferred configuration is that the device, i.e. in particular the rear body or the bicycle fork of a bicycle, comprises two resiliently configured braces which are parallel-connected and mounted on the same side of the plane of the wheel.

Reference is made to the fact that parallel-connected may also but not exclusively be understood to mean that said braces are mounted parallel relative one another. Parallel-connected may in particular be understood to mean that, in particular when viewed from the wheel receiver, they are not mounted in series. The term "parallel-connected" may, if said braces are resilient, also refer to said springs. In cases that resilience is provided they may, however, be mounted such that said springs are not parallel-connected.

Preferably two resiliently configured braces of the device, i.e. in particular of the rear body or the bicycle fork, are mounted on the same side of the plane of the wheel and parallel-connected relative one another. For example in the case of the rear body, the present invention not being intended to be limited thereto, it may be such that a brace extends from the wheel receiver or the dropout substantially toward a crank set housing or in the proximity of the crank set housing, and a second brace extends from the dropout or the wheel receiver substantially toward the down tube.

A preferred configuration is that at least one, preferably at least two braces of the device, i.e. in particular of the rear body or the bicycle fork, are positioned on the same side of the plane of the wheel, radially inwardly and axially outwardly of a wheel mounted on the bicycle frame. In the condition that such a wheel is not mounted this means of course that area where said wheel is usually positioned after assembly.

Preferably the rear body is configured integrally.

It is particularly preferred that the rear body is integrally joined to the base frame.

Reference is made to the fact that in the sense of the invention, the term "brace" is to be understood to mean in particular a component part of the frame, while said term is not intended to be limited to frame components which in bicycle body are usually designated as braces, such as chain braces or seat braces. In the sense of the invention, however, known coil springs or air springs by which the rear body is sprung relative to the base frame, are not to be understood to mean "brace".

A brace may in the sense of the invention be designed as a tube or of solid material or in another way. It is particularly preferred that the resilient brace is made of carbon fibers or fiberglass. It is further preferred that the other portions of the bicycle frame are made of carbon fibers or fiberglass.

A preferred configuration according to the invention may for example be such that a bicycle frame, in particular a base frame with a rear body, is formed integrally for example of carbon fibers or fiberglass, wherein the resilience which allows a spring action of the rear wheel receiver or the subsequently mounted rear wheel is provided in this frame through its configuration and the material selected. However, reference is made to the fact that the invention is not intended to be limited thereto.

It is further preferred that in particular the resilient braces are made of other materials such as aluminum or steel or the like. With steel being used it is particularly preferred that the resilient effect is caused by the design. For example the cross-section of a steel brace may be dimensioned such that a low bending stiffness is provided in at least one dimension in order to allow spring deflection and rebound of the rear wheel in particular based on said design.

In this conjunction we note that steel frames are of course generally known. However, these known steel frames are produced such that the rear wheel receiver is firmly attached relative to the rest of the rear body and, in unsprung bicycles, also relative to the base frame. In such configurations it is for example the cross-sectional profiles of the tubes or the braces which prohibit as far as possible a bending of the braces.

According to the invention it is particularly preferred that the braces or the brace arrangement are configured resilient such that the wheel receiver, i.e. in particular the rear wheel receiver or the front wheel receiver is resiliently flexible during normal operation of the bicycle or with the loads that usually occur, respectively, along a suspension travel of at least 1 mm, preferred at least 2 mm, particularly preferred at least 4 mm, preferred at least 5 mm, preferred at least 7 mm, particularly preferred at least 10 mm, particularly preferred at least 13 mm, particularly preferred at least 15 mm.

A preferred configuration is that at least one resiliently configured brace is configured or mounted as a leaf spring. It is particularly preferred that such a brace is configured as a type of leaf spring which is firmly clamped in at one side, for example firmly attached to a substantially rigid base frame, and at another position, for example at one end, comprises an accommodating area for accommodating a wheel.

A preferred configuration is that the resiliently configured brace or an arrangement of more than one resiliently configured braces are mounted such that spring deflection and/or rebound of the wheel receiver or of the wheel are bend-loaded, i.e. in particular such that said brace is bent about an axis which is substantially perpendicular to said brace.

A preferred configuration is that at least one adjust means for adjusting the resilience properties of the bicycle frame and/or for adjusting the damping properties is provided. Resilience or damping properties in the sense of the present invention is in particular understood to mean a predetermined parameter of a spring device or an arrangement consisting of at least one frame brace which is resiliently configured and acts as a spring, or a predetermined parameter of a damping means. It is particularly preferred that an adjustable parameter of the spring or the brace (arrangement) is the spring rate. It is further preferred that an adjustable parameter of the damper device is the damping rate.

It is particularly preferred to provide that the spatial position of at least one resiliently configured brace of the bicycle frame or the spatial position of at least one section of such a brace is adjustable by means of the adjust means. For example it is provided, the present invention not being intended to be limited thereto, that at least one screw or the like engages with a resiliently configured brace and with a further frame component, such as a resiliently configured brace or rigid frame component, and that the pre-stress of the one resiliently configured brace or of both resiliently configured braces is adjustable by turning said screw.

The resilience or damping properties can be adjusted continuously or—in an alternative configuration—in steps. A continuous adjustment can—the present invention not being intended to be limited thereto—for example be effected by means of a screw. A stepped adjustment can—the present invention not being intended to be limited thereto—for example be effected by means of a component positioned between a resiliently configured brace and another, also resiliently configured brace of the frame or a rigid frame component wherein the engagement positions are discretely variable so as to vary their distance toward one another.

It is also preferred that at least one return spring is provided for counteracting at least one resilient brace of the frame acting as a spring or at least counteracting in predetermined load ranges. A particularly preferred configuration provides that the spring force of said return spring is adjustable by means of the adjust means. Preferably the return spring is configured as a brace or a component of the bicycle frame and/or of the bicycle fork and/or of the rear body.

It is particularly preferred to provide that the adjust means can be adjusted by the cyclist during a ride or during operation of the bicycle. For example—the present invention not being intended to be limited thereto—it is provided that a control element of the adjust means such as an adjusting knob or the like is positioned in the region of the end of the seat tube nearer the saddle or anyway such that the cyclist can operate it while riding.

It is particularly preferred that the adjust means further comprises locking means.

It is preferred that in the region of at least one resiliently configured brace resilient additional components are detachably mounted such that by means of these resilient additional components the spring rate of the spring acting on the wheel accommodating area can be adjusted. The configuration may for example be such that a resiliently configured brace can accommodate further resiliently configured detachable braces. The configuration may in particular be such that the resilient additional components are attached such that leaf spring assemblies are generated which are configured substantially like or similar to those used in the automotive industry. In this conjunction reference is made to the fact that said leaf spring assemblies may comprise braces of different lengths or braces of identical lengths. The additional components may be screwed or otherwise attached to the brace.

Reference is made to that even if spring assemblies as used in the automotive industry are mentioned, the embodiment of the present invention includes spring assemblies in particular configured such that the number of the braces compiled into a spring assembly is variable. It is further preferred that such a spring assembly is loaded in the way as mentioned above.

A preferred configuration provides at least one securing, detachable additional component. Said securing additional component may for example be a substantially rigid brace which can be additionally attached and removed. When a securing additional component is attached, a preferred configuration of the invention provides that the spring action effected on a wheel receiver by the resilient braces or the resilient brace arrangement is neutralized.

Such a configuration allows for example a rapid changeover from a sprung wheel to an unsprung wheel. For example if said securing additional component is intended to neutralize the resilience of the spring acting on the rear wheel receiver, it may be positioned such that it connects the seat tube of a bicycle or the base frame of a bicycle with the wheel receiver. Other configurations are, however, also preferred.

The securing additional component can be configured entirely detachable and/or partially detachable in non-mounted or non-effective condition such that it remains attached to the bicycle but is not operative. This can for example be achieved in that a connection at a coupling point is released and the securing additional component is folded away or retracted or its effect as a securing component or a component neutralizing a resilience is otherwise eliminated.

A preferred configuration provides at least one damper device which causes a damping of the movement of the spring-mounted wheel receiver. Such a damper can—the present invention not being intended to be limited thereto—for example be mounted between different resiliently configured braces. The damper device may also be positioned between a resiliently configured and a substantially rigidly configured brace. It is also preferred that said damper device is positioned between a resiliently configured brace and the base frame. A plurality of further possibilities of arrangement of such a damper device is possible and preferred.

A preferred configuration provides a damper device positioned in the region of or within the rear body or between the rear body and the base frame.

It is further preferred that one such damper device is positioned in the region of the front wheel fork.

It is particularly preferred that in the region of the front wheel fork and in the region of the rear body at least one damper device is positioned on each side of the plane of the wheel.

It is preferred that a damper is positioned at least partially radially inwardly and axially outwardly of a wheel mounted on the bicycle.

It is further preferred that according to the invention, resilient braces are positioned substantially mirror-image symmetrical relative the plane of the wheel.

A preferred configuration provides a guide device for guiding the wheel receiver during spring deflection and/or rebound. Such a guide device can in particular be configured such that the wheel receiver moves on a predetermined path during spring deflection and/or rebound.

It is further preferred to provide more than one resiliently configured brace which, in particular in interaction, determine or substantially define the path of movement of the wheel receiver during spring deflection and/or rebound.

Different resilient braces allocated to the same device such as the rear body or the bicycle fork may, in particular as regards their resilient portion, be configured and/or shaped similar or different and/or be equal or different in length.

A preferred configuration provides different braces mounted in a parallelogram design wherein at least two of said braces are configured substantially resilient.

It is further preferred that the braces, in particular the resilient braces, are configured bent in longitudinal direction. The braces, in particular the resilient braces can, however, also be designed straight or in any other way.

A preferred configuration provides that during spring deflection and/or rebound the wheel receiver for accommodating the rear wheel moves such that there is substantially no influence on the chain tension of a drive chain caused by said spring deflection and/or rebound.

Preferred configurations according to the invention such as in particular the configuration having a guide device for guiding the wheel receiver and/or the preferred configuration in which braces interact for determining the path of movement of a wheel receiver during spring deflection and/or rebound, can in particular result in that during spring deflection and/or rebound the rear wheel axle moves substantially on a section of a circular path extending about a central axis of the wheel bearing housing. Such a configuration can in particular result in that the bicycle chain, in particular its upper, loaded portion, is not (additionally) loaded or relieved during spring deflection and/or rebound because of said spring deflection and/or rebound or that an uneven load on the chain occurs caused by said spring deflection and/or rebound. In this conjunction, however, reference is made to the fact that these preferred embodiments may also be configured such that said advantage or said effect is not present.

A preferred configuration provides the resilience of the at least one brace to be such that the wheel receiver or the wheel of the bicycle can move in a plane substantially parallel to the plane of the wheel.

It is particularly preferred to provide that the wheel receiver is perpendicular to the plane of the wheel and substantially non-movable. This can for example be achieved by the shape of the material or the cross-sectional relations or stabilizing measures or in any other way.

Reference is made to the fact that the term "plane of the wheel" refers to each individual wheel and its allocated device such as the bicycle fork or the rear body. This is mentioned in particular because in a curve the front wheel receiver or the plane of the rear wheel would (also) move perpendicular relative to said plane. The relation is intended to be, as regards the front wheel receiver, the plane of the front wheel, and as regards the wheel receiver of the rear wheel, the plane of the rear wheel.

Said non-movability is in particular intended to prohibit a sideward breakaway. However, reference is made to the fact that the invention may as well omit said effect.

The invention provides in particular a bicycle fork comprising at least one resilient brace which leads to that the wheel receiver or the dropout or a wheel designed to be mounted thereto is spring-mounted.

Reference is made to that in particular the wording of the present application is not intended to limit the invention to configurations which are connected with a bicycle fork having a resilient brace and also comprise a rear body having a resilient brace; rather, such resilient braces can in particular be provided either in the region of the rear body or in the region of a bicycle fork coupled to the bicycle frame, or both in the region of the bicycle fork and in the region of the rear body.

The invention in particular provides a method for producing a bicycle frame in which a bicycle frame is produced wherein the geometry, in particular the geometry of the cross-sections of the braces, and the materials are selected so as to resiliently configure a portion of the frame braces such that at least one wheel receiver is spring-mounted.

The invention thus provides in particular that a bicycle frame is produced such that a resilience for damping the wheel receiver or at least one wheel is present without requiring known spring components such as coil springs or air springs positioned between the rear body and the base frame, or corresponding known springs positioned in the fork leg or the fork column of the bicycle fork.

However, reference is made to that according to the invention it is also preferred to use an embodiment of the invention only in the region of the rear body with the bicycle fork configured non-resilient or having conventional spring systems. Furthermore it is correspondingly preferred that only a bicycle fork is designed according to the invention while the bicycle rear body is of a conventional design i.e. either sprung or unsprung.

The following comment is presented on the term of "bicycle frame".

A bicycle frame in the sense of the present invention is in particular understood to be a unit of a base frame and a rear body or a unit of a base frame, a rear body and a fork mounted thereto.

The invention is not intended to be limited by the exemplary preferred configurations.

BRIEF DESCRIPTION OF THE DRAWINGS

Some aspects of preferred configurations of the invention will now be explained in detail with reference to the drawings, the present invention not being intended to be limited thereto.

DETAILED DESCRIPTION OF THE PREFERRED EMBODIMENT

Figure 1:
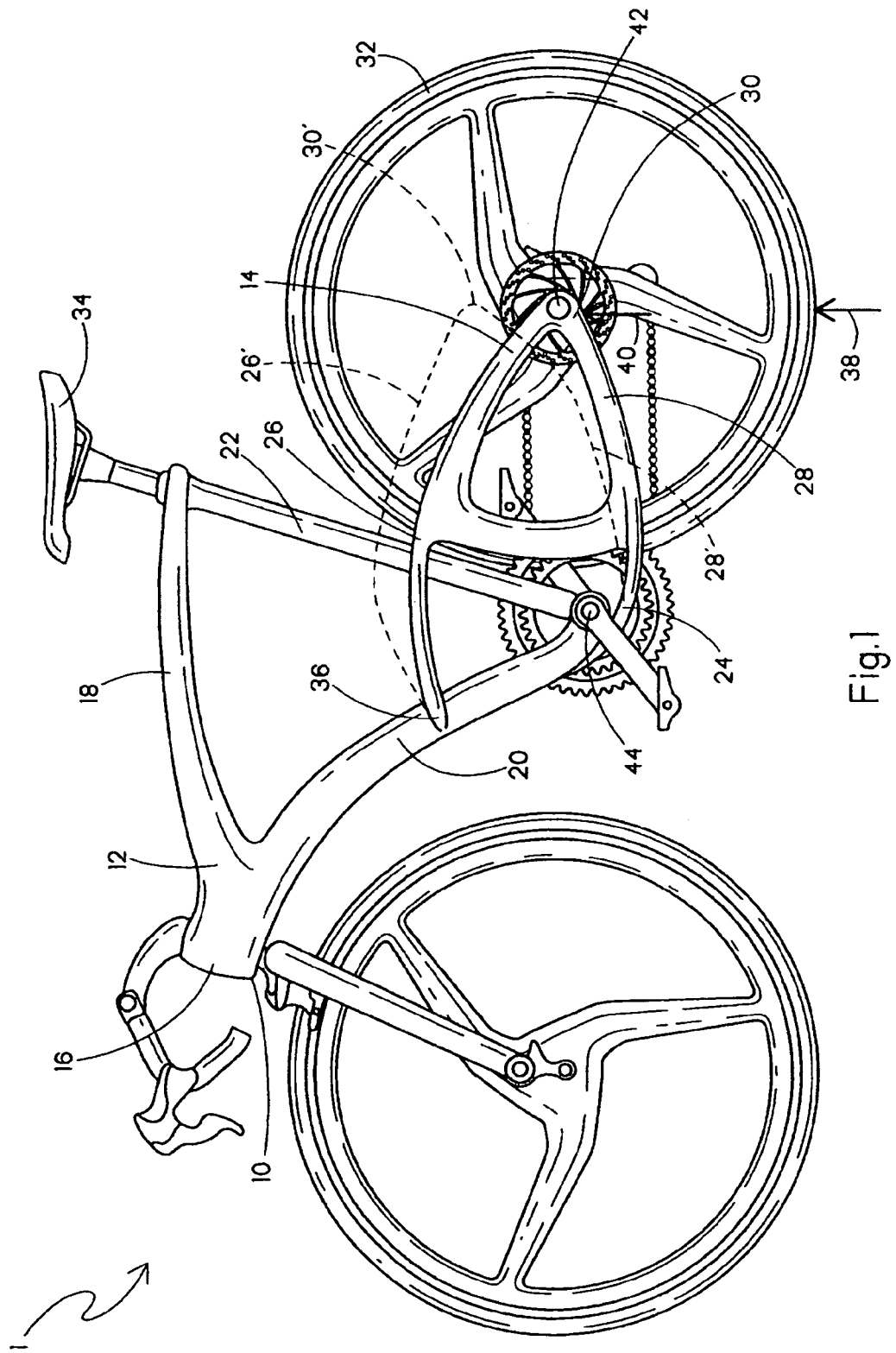
FIG. 1 is a schematic representation of a first exemplary embodiment of the invention.

FIG. 1 shows a bicycle 1 comprising a bicycle frame 10 according to the invention.

The bicycle frame comprises a base frame 12 and a rear body 14. The rear body 14 is a particular configuration of the device which, in the scope of the present disclosure, is more generally referred to as a device connected with the base frame.

The rear body 14 is—in particular in the configuration of FIG. 1—a component part of the bicycle frame 10.

The base frame 12 in the configuration of FIG. 1 comprises a head tube 16, a top tube 18, a down tube 20, and a seat tube 22.

In this conjunction reference is made to the fact that the designations "head tube", "top tube", "down tube" and "seat tube" are used in particular in view of the terms usually used in the field of bicycles, not necessarily implying that said "tubes" are in fact shaped as tubes. In the sense of the invention, said "tubes" may or may not be shaped as tubes.

In the configuration of FIG. 1, the base frame 12 is made of carbon or carbon fibers, in particular of short carbon fibers or long carbon fibers.

The base frame 12 further comprises a crank set housing 24.

The rear body 14 comprises a seat brace 26, a chain brace 28 and a wheel receiver or dropout 30.

The dropout 30 accommodates the rear wheel 32 of the bicycle 1.

The seat brace 26 extends from the dropout 30 toward the down tube 20 and is upwardly, i.e. in the direction of the saddle 34, arched. The end 36 of the seat brace 26 facing away from the dropout 30 for accommodating the rear wheel 32 is firmly or integrally connected to the down tube 20. The connecting point between the seat brace 26 and the down tube 20 in the configuration of FIG. 1 is positioned between the ends of the down tube 20, for example at about the center of the down tube 20.

The chain brace 28 is arched downwardly, i.e. in a direction facing away from the saddle 34.

The chain brace 28 connects the dropout 30 with the down tube 20 or the crank set housing 24 where it is firmly and integrally connected to the base frame 12.

Both the seat brace 26 and the chain brace 28 are configured resilient.

When the rear wheel 32, as arrow 38 indicates schematically, is loaded with a force, in particular a dynamic force, which for example may be caused by roughness of the ground or the like during operation of the bicycle 1, or for example through the load on the bicycle by the weight or the weight force of the rider, a corresponding force is exerted on the dropout 30 as arrow 40 indicates schematically.

Under the influence of said force, the arrangement of the resilient braces 26, 28 deflects such that the dropout 30 is displaced relative the base frame 12. This causes the seat brace 26 and the chain brace 28 to be deformed and/or displaced. These displaced positions are indicated schematically for the seat brace 26 by the dashed line 26', for the chain brace 28 by the dashed line 28', and for the dropout 30 by the point 30'.

In a preferred configuration this displacement or deformation may be such that the region of the dropout 30', which accommodates the wheel axle 42 of the wheel 30 or at which said wheel axle 42 is positioned or which moves said wheel axle 42 along a section of a circular path about the central axis 44 of the crank set housing 24, wherein the radius of said circular path substantially corresponds to the distance from the central axis 44 of the crank set housing 24 to the wheel axle 42 of the rear wheel 32.

After a corresponding in particular dynamic relief the arrangement rebounds from the resilient braces 26, 28 with a corresponding tension acting in the braces 26, 28.

In this conjunction reference is made to that other paths of movement for deflection are also preferred and possible.

Reference is made to that the described configuration of the rear body 14 is in particular mirror-image symmetrical to the plane generated by the wheel, in this case the rear wheel.

Figure 2:
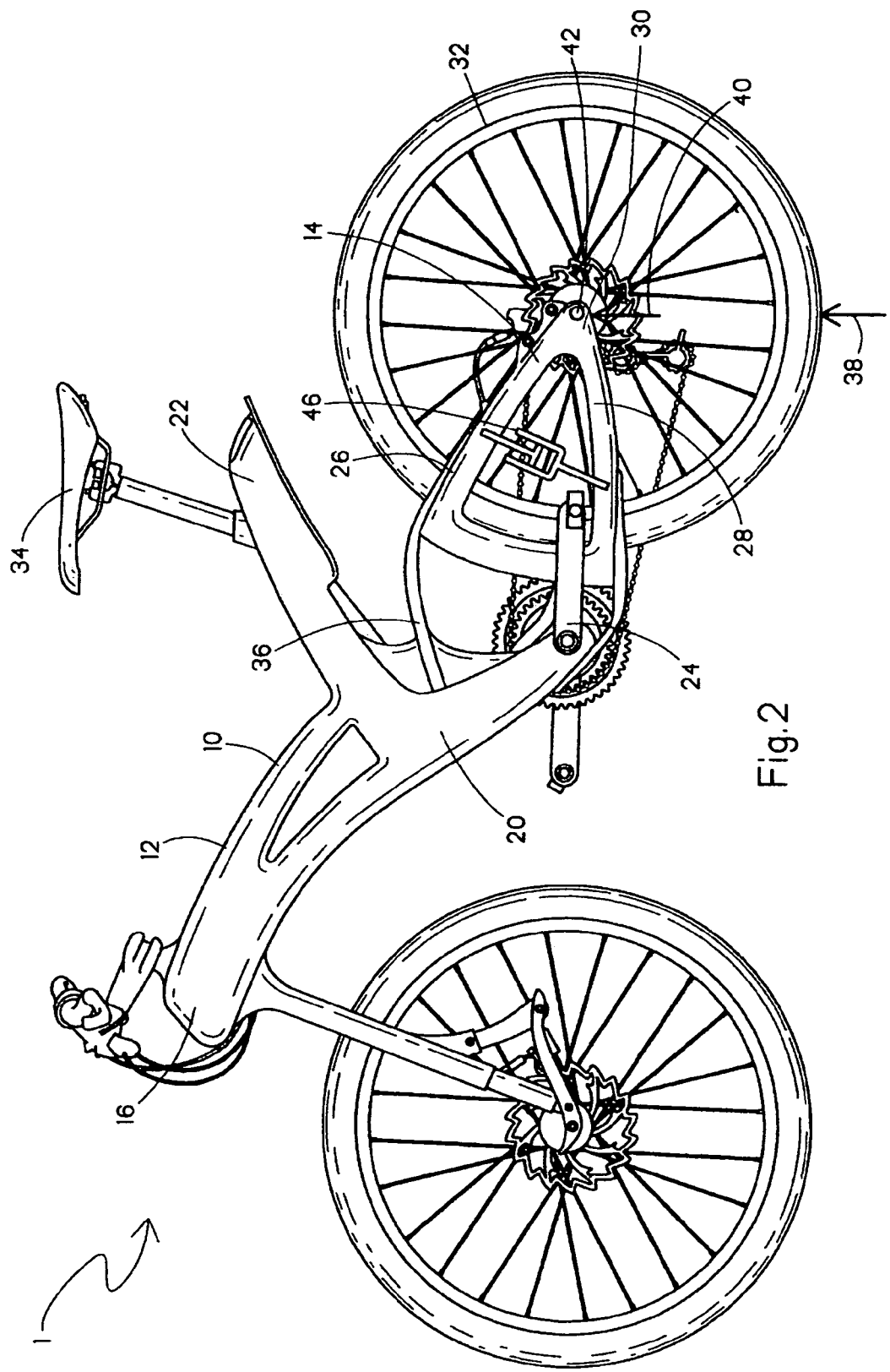
FIG. 2 is a schematic representation of a second exemplary embodiment of the invention.

FIG. 2 is a schematic representation of an exemplary embodiment of the invention.

The exemplary embodiment of FIG. 2 differs from that of FIG. 1 in particular in the configuration of the base frame 12 which in FIG. 2 does not comprise a top tube 18.

Instead, the seat tube 22 extends toward the down tube 20 and is secured to it between its ends.

The arrangement of base frame 12 and rear body 14 in the configurations of FIGS. 1 and 2 are integrally produced of carbon fibers.

Figure 3:
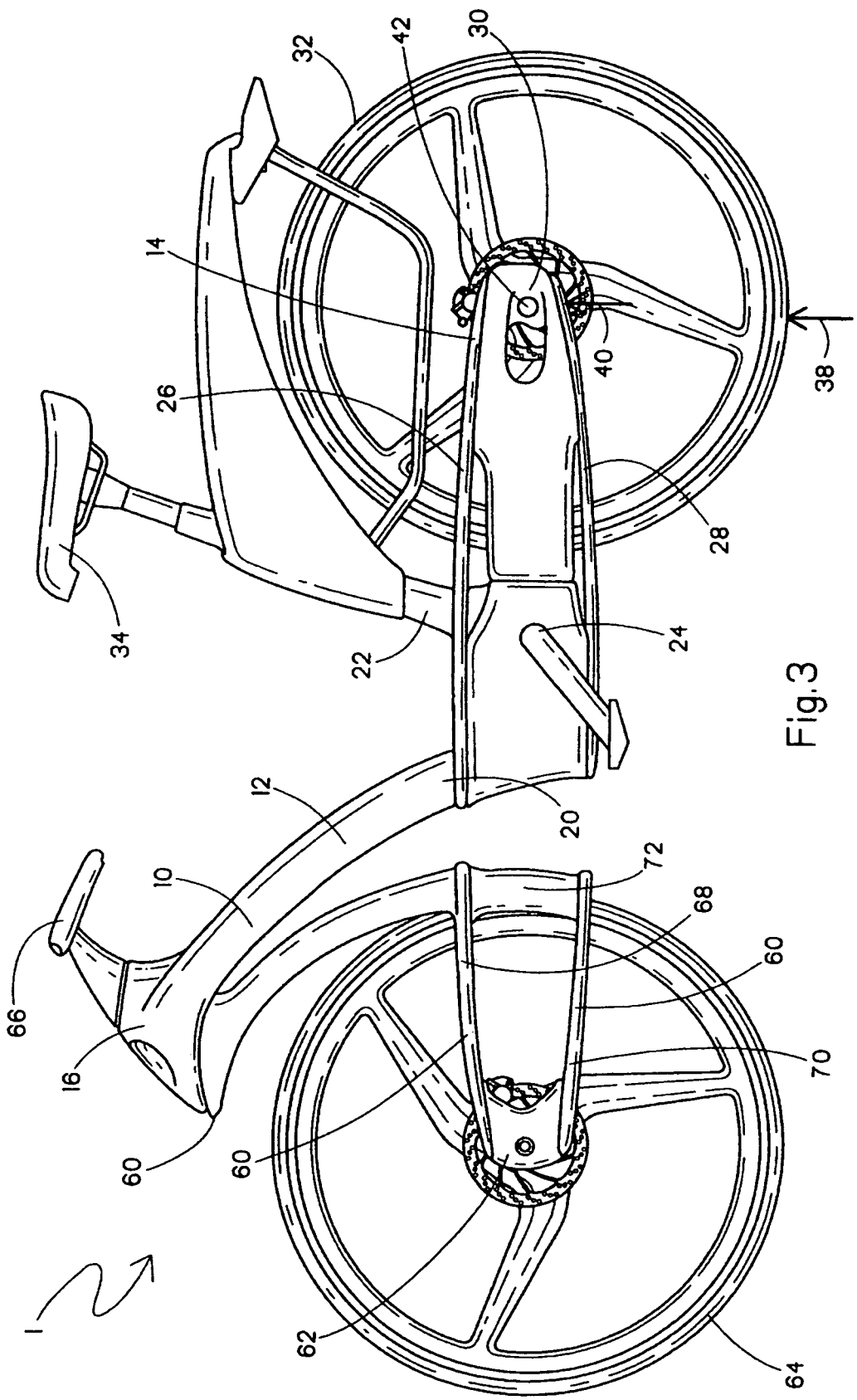
FIG. 3 is a schematic representation of a third exemplary embodiment of the invention.
Figure 4:
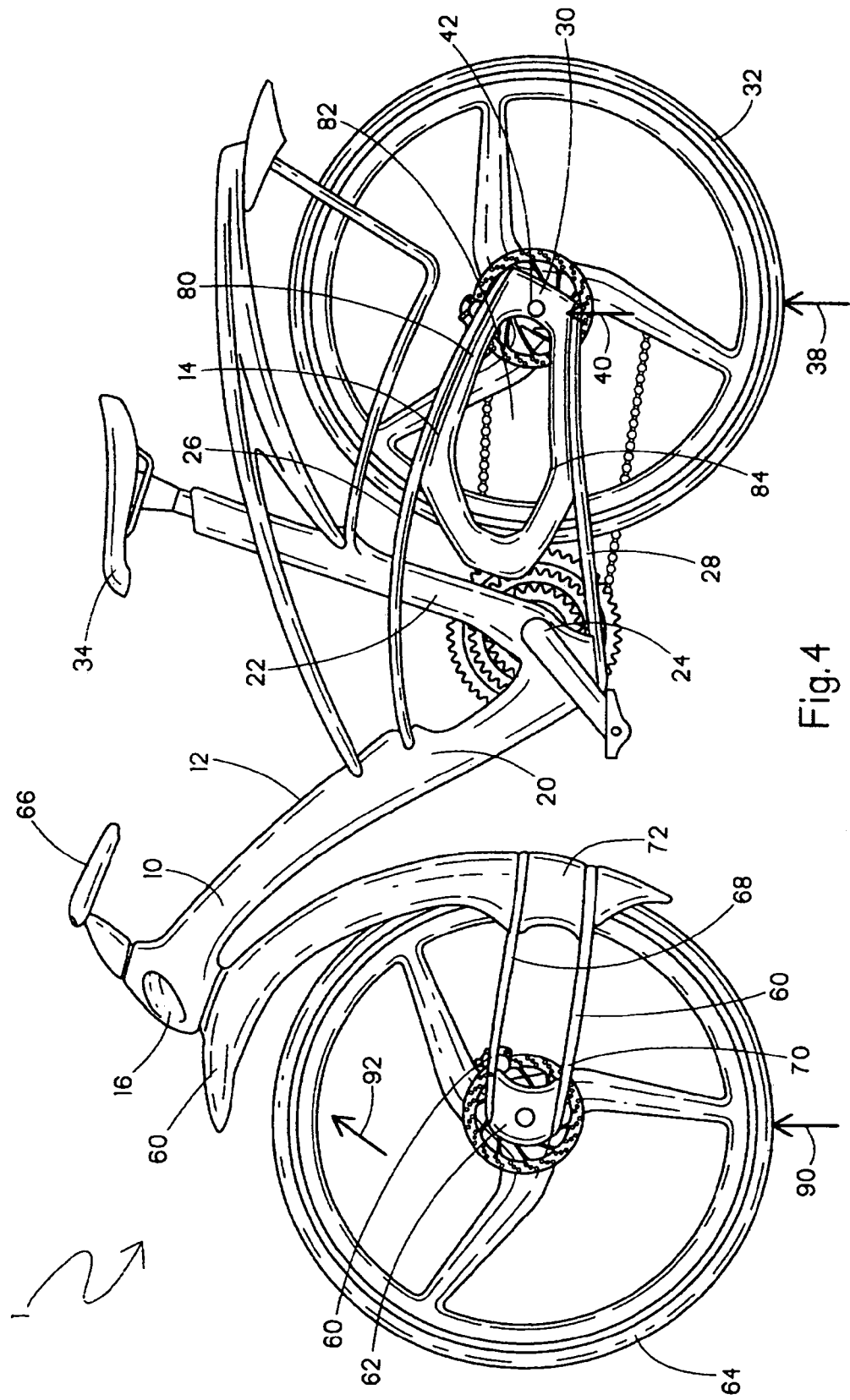
FIG. 4 is a schematic representation of a fourth exemplary embodiment of the Invention.

The configuration further schematically indicates a damper device 46 mounted between and supported at the braces 26, 28; such damper devices 46 may also be provided in the configurations of FIGS. 1, 3 and 4; however it is also preferred that such damper devices 46 are absent.

In the configurations of FIG. 1 and FIG. 2, the seat braces 26 are configured parallel to the chain braces 24.

The closed contour defined by the chain brace 28, the seat brace 26 and a portion of the down tube 20 is designed substantially in the shape of an eye.

The configurations of FIG. 1 and FIG. 2 thus provide more than one resilient brace 26, 28 at the device or the rear body 14, each on the same side of the plane of the wheel.

FIG. 3 is a schematic representation of a third exemplary embodiment of the invention.

In the configuration of FIG. 3 the rear body 14 comprises two resiliently configured braces 26, 28. Said braces, i.e. the seat brace 26 and the chain brace 28, are connected with the dropout 30. In a region at a distance or facing away from the dropout 30 said braces 26, 28 are connected with the base frame 12.

The seat brace 26 is firmly connected to the down tube 20 at the end facing away from the dropout 30, and the chain brace 28 is also firmly connected to the down tube 20 at the end facing away from the dropout 30. It is further conceivable—this may, however, be omitted—that the seat brace 26 is firmly connected to the seat tube 22 in the region between its ends. If necessary, the chain brace 28 may further be firmly connected with the crank set housing 24 or with the seat tube 22 in the region of said crank set housing 24.

The chain brace 28 is slightly curved in the direction facing away from the saddle, and the seat brace 26 is slightly curved in the direction facing the saddle. These curvatures are configured slight such that the braces 26, 28 are aligned approximately parallel to one another.

FIG. 3 further shows another device mounted at the base frame 12 and comprising a bicycle fork 60.

The bicycle fork 60 of FIG. 3 comprises a receiver or a dropout 62 for accommodating a front wheel 64, of a substantially rigid design. The bicycle fork 60 is rotatably mounted in the head tube 16 of the base frame 12 such that by means of a handlebar 66 the front wheel can be steered through the bicycle fork 60. The bicycle fork 60 further comprises a first resilient brace 68 and a second resilient brace 70.

The bicycle fork further comprises a rigid component 72 shaped as a fender which extends from the end of the head tube 16 facing the front wheel in the direction of the base frame 12 in a curve around a region of the front wheel 64 and may run from one side of the plane of the wheel in a curve to the other side of the plane of the wheel.

A preferred configuration provides that said fender-type component may be shaped such as to include the function of a fender. The fender-type component 72 is configured rigid and firmly coupled to a tube extension which extends into the head tube 16. In a region facing away from said tube extension, the component 72 is firmly coupled to the braces 68, 70 which in their regions facing away from said component 72 are firmly connected to the dropout 62.

In the regions of the dropout 62 and the component 72 the braces 68, 70 are distanced from one another. The braces 68, 70 run from the dropout 62 to the component 72 in a slightly diverging path and in a curve away from each other.

FIG. 4 is another schematic representation of an exemplary configuration with the bicycle frame 10 of the invention or the bicycle fork 60 of the invention, respectively.

The configuration of FIG. 4 provides a resilient seat brace 26 of the rear body 14 and a resilient chain brace 28 of the rear body 14.

The resilient seat brace 26 extends from the dropout 30, curved in the direction of the saddle 34, toward the down tube 20. The resilient chain brace extends from the dropout 30 first in a curve in the direction of the saddle and then in a curve away from the saddle toward the region of the crank set receiver where it is secured. Between the braces 26, 28 a component 80 is positioned which is supported on the braces 26, 28 and on the dropout and comprises a through hole 82 which is surrounded by a wall 84. One portion of said wall 84 supports the seat brace 26 and another portion of said wall 84 supports the chain brace 28. Both the chain brace 28 and the seat brace 26 are supported on the outside of the wall 84 of the component 80 such that the through hole 82 extends substantially perpendicular to the plane generated by the braces 26, 28 and is positioned between them.

FIG. 4 further shows a device configured as the bicycle fork 60 and rotatably connected to the base frame 12. This bicycle fork differs from the bicycle fork illustrated in FIG. 3 substantially in that the braces 68, 70 are mounted substantially parallel and run downwardly inclined from the dropout 62 in the direction of the fender-type component 72; in the configuration of FIG. 3 the brace 68 runs upwardly inclined, viewed in this direction, while the brace 70 runs downwardly inclined.

The configuration of the bicycle fork 60 of FIG. 4 further differs from the bicycle fork 60 of FIG. 3 in particular in that the fender-type component 72, viewed in the direction of travel, projects from the head tube, and in that the other end of said fender-type component is not coupled with the brace 70 in its end region (as in FIG. 3) but at a point facing away from said end region.

When the front wheel 64 in the configuration of FIG. 3 or FIG. 4 is loaded in the direction of the arrow 90, i.e. for example caused by roughness of the ground or the weight force of a rider, a force acts through the surface shell on the ground, the fork 60 deflects as arrow 92 schematically indicates, wherein the braces 68, 70 deform elastically and the front wheel receiver 62 or the front wheel, respectively, moves relative the base frame in the plane of the front wheel. After relief of load, the fork 60 rebounds correspondingly. The actual path of movement depends on a number of factors, such as the spring rates and/or the relative placement and/or the measurements of the braces, and is configured to be preset.

Reference is made to that resilient braces 68, 70 are preferably mounted on both sides of the plane of the front wheel 64, in particular mirror-image symmetrical relative said plane.

It is further preferred that resilient braces 26, 28 of the rear body 14 are mounted on both sides of the plane of the rear wheel 32, in particular mirror-image symmetrical relative said plane.

Reference is further made to that it is preferred that the resilient braces 26, 28 of the rear body 14 or the resilient braces 68, 70 of the bicycle fork are mounted and configured such that both the rear wheel 32 and the front wheel 64 are mounted directionally stable.

The invention claimed is:

1. A bicycle frame comprising: a base frame having a down tube, a crank set housing with a central axis and at least one device which is mounted on the base frame, provided in the form of a brace structure and has an accommodating area for accommodating a wheel, and at least one brace of the brace structure is configured resilient such that the accommodating area is spring-mounted, wherein said at least one device is a rear body including a rear wheel receiver configured for receiving a rear wheel, and having on each side of said frame, associated with a corresponding side of the rear wheel, a pair of braces meeting at a dropout adjacent a rear wheel axle, wherein said rear body comprises at least one chain brace and at least one seat brace forming said dropout, wherein at least both said at least one seat brace and said at least one chain brace are configured resiliently such that said dropout is displaceable relative to said base frame, and wherein said at least one seat brace is upwardly arched and said at least one chain brace is downwardly arched relative to said dropout to enhance the application of tension by said at least one chain brace and said at least one seat brace, both said chain brace and said seat brace being connected to said down tube, and said chain brace disposed below said central axis.

2. The bicycle frame according to claim 1, wherein at least one damper is mounted at least partially radially inwardly and axially outwardly of a wheel attached to the bicycle frame.

3. The bicycle frame according to claim 1, wherein said device is a bicycle fork.

4. The bicycle frame according to claim 1, wherein resilience is effectively present substantially on a plane parallel to the plane of the wheel.

5. The bicycle frame according claim 1, wherein the resilient brace comprises carbon fibers and/or fiberglass.

6. The bicycle frame according to claim 1, wherein said device comprises two resilient and parallel-connected braces mounted on the same side of the plane of the wheel.

7. The bicycle frame according to claim 1, wherein a resiliently configured region of the at least one resiliently configured brace is mounted radially inwardly and axially outwardly of a wheel attached to the bicycle frame.

8. The bicycle frame according to claim 1, wherein the rear body is configured integrally.

9. The bicycle frame according to claim 1, wherein the rear body is integrally connected with the base frame.

10. The bicycle frame according to claim 1, wherein at least one adjust means is provided for adjusting the resilience properties of the bicycle frame and/or for adjusting the damping properties.

11. The bicycle frame according to claim 10, wherein by means of the adjust means the pre-load and/or the spatial position of at least one resilient brace is variable.

12. The bicycle frame according to claim 1, wherein in the region of at least one resiliently configured brace resilient additional components are detachably mounted such that by means of said resilient additional components the spring rate of the spring acting on the wheel accommodating area can be varied.

13. The bicycle frame according to claim 12, wherein said resilient additional components are configured as braces.

14. The bicycle frame according to claim 1, wherein the at least one resiliently configured chain and/or seat brace acts as a spring by means of which a wheel receiver is spring-mounted.

15. The bicycle frame according to claim 14, wherein at least one securing additional component is detachably mounted such that with the securing additional component attached, the wheel receiver is mounted substantially unsprung, and with the securing additional component not attached, the wheel receiver is substantially spring-mounted.

16. The bicycle frame according to claim 15, wherein at least one damper device is provided for damping the movement of the spring-mounted wheel receiver.

17. The bicycle frame according to claim 16, wherein the damper device engages with a chain brace of the rear body.

18. The bicycle frame according to claim 16, wherein the damper device is mounted between a chain brace of the rear body and a seat brace of the rear body.

19. The bicycle frame according to claim 14, wherein more than one resiliently configured braces are provided which, in particular in interaction, determine the path of movement of the wheel receiver during spring deflection and/or rebound.

20. The bicycle frame according to claim 19, wherein during spring deflection and/or rebound the wheel receiver for accommodating a rear wheel moves such that there is substantially no influence on the chain tension of a drive chain caused by said spring deflection and/or rebound.

21. The bicycle frame according to claim 19, wherein the wheel receiver for accommodating a rear wheel moves during spring deflection and/or rebound, that the rear wheel axle moves substantially on a section of a circular path which extends about an axis of a crank set housing of the bicycle frame.

22. The bicycle frame according to claim 14, wherein the wheel receiver is perpendicular to the plane of the wheel and is substantially non-movable.

23. A bicycle fork for a bicycle frame according to claim 1.

24. A bicycle frame comprising: a base frame having a down tube, a crank set housing with a central axis and at least one device which is mounted on the base frame, provided in the form of a brace structure and has an accommodating area for accommodating a wheel, and at least one brace of the brace structure is configured resilient such that the accommodating area is spring-mounted, wherein the at least one device is an integrally configured bicycle rear body which is integrally connected with the base frame and wherein a wheel receiver for accommodating a rear wheel moves during a spring deflection and/or rebound, and that a rear wheel axle moves substantially on a section of a circular path which extends about the axis of a crank set housing of the bicycle frame, and wherein said rear wheel receiver is unitary and is defined on each side of the wheel by opposing ends of a pair of integrally formed braces which encircle a corresponding end of said rear wheel axle; said rear body comprises at least one chain brace and at least one seat brace forming said dropout, wherein at least both said at least one seat brace and said at least one chain brace are configured resiliently such that said dropout is displaceable relative to said base frame; said device comprises two resilient and parallel-connected braces mounted on the same side of the plane of the wheel; and wherein said resilient brace comprises carbon fibers and/or fiberglass, both said chain brace and said seat brace being directly connected to said down tube, and said chain brace disposed below said central axis.

25. A bicycle frame comprising: a base frame having a down tube, a crank set housing with a central axis and at least one device which is mounted on the base frame, provided in the form of a brace structure and has an accommodating area for accommodating a wheel, and at least one brace of the brace structure is configured resilient such that the accommodating area is spring-mounted, wherein said at least one device is a rear body including a rear wheel receiver configured for receiving a rear wheel, and having on each side of said frame, associated with a corresponding side of the rear wheel, a pair of braces meeting and forming at an intersection of said braces a dropout with a circular aperture for encircling a rear wheel axle, said device comprises two resilient and parallel-connected braces mounted on the same side of the plane of the wheel; and wherein said at least one resilient brace comprises carbon fibers and/or fiberglass, both said chain brace and said seat brace being connected to said down tube, and said chain brace disposed below said central axis.

* * * * *